Jan. 7, 1964  R. L. HURTLE  3,117,203
CIRCUIT PROTECTIVE DEVICES AND CIRCUITS
Filed May 17, 1960  3 Sheets-Sheet 1

Inventor:
Ralph L. Hurtle,
by J. Wesley Hawker
Attorney.

Jan. 7, 1964    R. L. HURTLE    3,117,203
CIRCUIT PROTECTIVE DEVICES AND CIRCUITS
Filed May 17, 1960    3 Sheets-Sheet 2
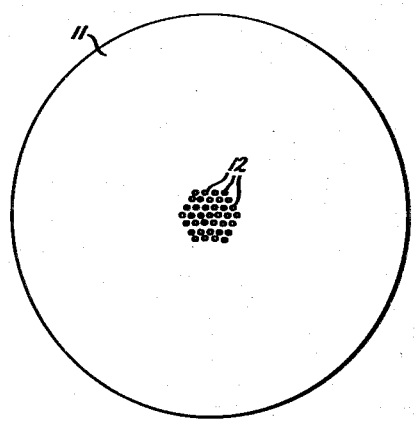
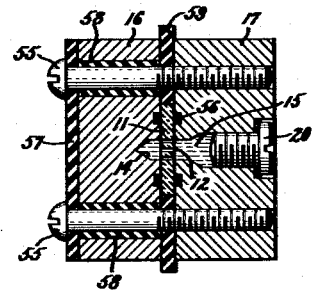
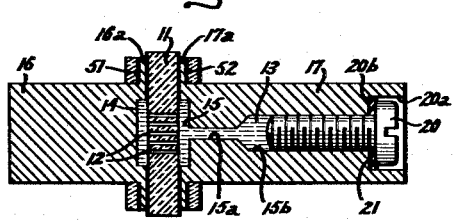
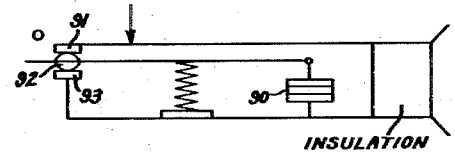
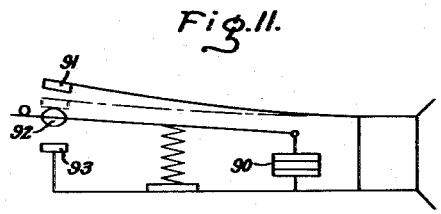
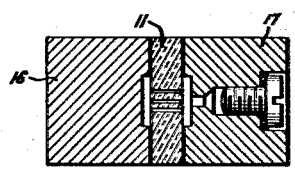
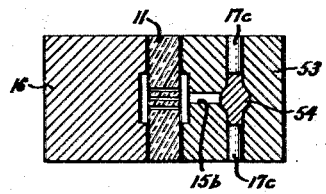
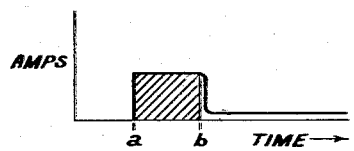
Inventor:
Ralph L. Hurtle
by J. Wesley Nauher
Attorney.

Inventor:
Ralph L. Hurtle

United States Patent Office 3,117,203
Patented Jan. 7, 1964

3,117,203
CIRCUIT PROTECTIVE DEVICES AND CIRCUITS
Ralph L. Hurtle, West Hartford, Conn., assignor to General Electric Company, a corporation of New York
Filed May 17, 1960, Ser. No. 29,629
3 Claims. (Cl. 200—113)

This application is a continuation-in-part of my application S.N. 859,773 filed December 15, 1959, now abandoned, entitled "Circuit Protective Devices and Circuits," and assigned to the same assignee as the present invention.

My invention relates to electric circuit protective devices, apparatus and circuits, and more particularly to current limiting devices especially adapted for use in conjunction with means for disconnecting or otherwise protecting electric load circuits and equipment. More specifically my invention relates to an improved device for substantially instantaneously limiting the magnitude of a potentially destructive electric current, such as may arise from a short circuit or other abnormal circuit condition, and maintaining this current at or reducing it to a value which may be readily interrupted by other means.

By "current limiting device" I mean one having such action in response to a potentially destructive current that as a result of that action the maximum instantaneous peak value of current which the device actually permits to flow (maximum let-through current) is considerably less in magnitude than the maximum instantaneous peak value of current which would have been carried by the device had it retained its normal impedance value (maximum prospective current), whether or not the device subsequently reduces the let-through current below such maximum let-through value. This concept of current limitation is applicable to either alternating current or direct current or direct current circuits, but since most utility power supply circuits are of the alternating current type, the concept is commonly applicable to the first half cycle of alternating current following the occurrence of a short circuit or other abnormal circuit condition. In this sense "current limiting" means that the peak instantaneous current is never permitted to attain the full maximum instantaneous value which the power source is capable of delivering in the absence of current limiting action.

The constantly increasing consumption of electric power has engendered a continual growth in the current supply capacity of power system. In addition, considerations of economy and emergency power supply have led to the interconnection of many such large capacity power systems, with the result that the available source capacity coupled to any one distribution or utilization circuit at the output end of the system is enormous in relation to the current-carrying capacity of that circuit or the current interrupting capacity of circuit breakers which may be economically applied to one such circuit. Of course, the entire large current supply capacity of the source is not directly available to each distribution or feeder circuit, but is normally separated therefrom by the limiting impedance of intervening transformers such as distribution transformers. As systems grow in size, however, these distribution transformers have become of increasingly large capacity, so that they are capable of delivering very large short-circuit currents.

While circuit breakers used on transmission, subtransmission, distribution, feeder and utilization circuits are of course effective to interrupt short circuit currents within their interrupting ratings, it is evident that ever larger circuit breakers are required as available short circuit currents increase due to system enlargement, system interconnection and increasing transformer capacity. This tends to be more of a problem on the lower voltage distribution and utilization circuits than on the higher voltage transmission and subtransmission circuits for the reason that in existing systems the ratio of available current to normal load current is commonly higher on the low voltage circuits than it is on the high voltage circuits.

Particularly in the lower voltage distribution and utilization circuits of power systems, then, there has been an increasing tendency to require circuit protective devices, such as circuit breakers, to have ever higher short circuit interrupting ratings. The use of increasingly large protective devices, of course, presents an economic problem. As a result, other means have been devised for protecting certain circuit interrupting devices, such as circuit breakers and contactors, against potentially destructive currents in excess of their interrupting rating. For example, the now well-known current limiting fuse has been used in series with resettable mechanical interrupting devices such as circuit breakers and so coordinated with the circuit breaker characteristics that the circuit breaker interrupts current in a lower range of excess currents without fuse action while the fuse interrupts excess current in a higher range without circuit breaker action. Such an arrangement is shown for example in Patent 2,358,215, Darling. While such a series arrangement of circuit breaker and current limiting fuse is effective in permitting the use of circuit breakers or other mechanical resettable interrupting devices on circuits having available short-circuit currents in excess of the interrupting ability of the breaker, the combination arrangement has the disadvantage that when the fuse does function, it is the fuse which accomplishes the circuit interruption by fusing and self-destructing action. The circuit can then be restored only by complete replacement of the fuse. Such action, of course, eliminates one of the principal desirable features of a circuit breaker, insofar as a principal reason for circuit breaker use is to avoid component replacement after each circuit protecting operation.

Thus while circuit breakers of large interrupting capacity are available and even larger breakers can surely be designed, their use on relatively low power circuits is often uneconomical where the ratio of available short circuit current to normal load current is very high. This is so because circuit breakers operate through the motion of mechanical parts which have inertia, and even the fastest breakers do not actually effect contact separation in less than one-half cycle of a commercial alternating current system. Therefore, as to its interrupting capacity and in respect to its ability to withstand high current momentarily without damage, a circuit breaker must be designed to accept one or several peaks of the maximum prospective short circuit current, and to tolerate this high current value. While these problems of expensive circuit breaker design have been avoided in certain applications by utilizing a series current limiting fuse to effect circuit interruption under certain high current conditions, such a fuse needs complete replacement after each fuse operation and thus sacrifices the advantages of ready resettability inherent in circuit breaker protective systems.

It is evident, therefore, that in order to limit the size of circuit protective and interrupting equipment, it is desirable to provide some means responsive to a short circuit or other excess current condition to severely and substantially instantaneously limit the magnitude of current which actually flows in the circuit to a value very markedly less than the maximum current which the source is able to supply, such limiting means maintaining or reducing the limited current without in itself effecting interruption so that the limited current may be actually interrupted by some other slower acting but resettable device, if in fact actual interruption is needed or desired. A desirable current limiter of this type is, of course, not self-destructive, and is either resettable or self-restoring to its initial condition. The current limiting fuse mentioned above does, of course, have desirable current limiting action and quick response, but is not self-restoring for the reason that the current limiting action, once initiated, destroys the fuse and effects circuit interruption by fusing action. It is evident, of course, that conventional impedance elements such as resistors and inductors provide automatically repetitive current-limiting action. Such conventional expedients for current limitation have, of course, been considered, but they have not proven economical or practically feasible because of their necessarily excessive size and current-carrying capacity.

Accordingly it is a principal object of my invention to provide an automatically operable device of a resettable or self-restoring type for substantially instantaneously limiting the magnitude of an excessive electric current without in itself interrupting that current.

A more particular object of my invention is to provide a self-restoring change-of-state device for severely and substantially instantaneously limiting excessive currents of short circuit magnitude without effecting current interruption.

Still a further object of the invention is the provision of a reusable current-limiting device which functions by developing and sustaining a high pressure arc having a high potential drop without in itself quenching the arc.

It is another object of my invention to provide a device of the foregoing character which, in addition to limiting the maximum instantaneous magnitude of current, subsequently reduces appreciably the current magnitude and regulates the current to a substantially constant reduced value.

Still another object of my invention is to provide a current-limiting circuit protective device which, partly because of its comparatively small heat sink, limits potentially destructive currents to much lower let-through values than does a comparably rated conventional current-limiting fuse.

In another aspect it is an important object of my invention to provide, in combination with a current interrupting device of the switch, circuit breaker, or contactor type, a current limiting device of the resettable or self-restoring type which is automatically and substantially instantaneously operable to limit the magnitude of potentially destructive currents, such as short-circuit currents, and thereby considerably reduce the current withstand and current interrupting duty imposed upon the circuit opening device.

In particular, the invention has for its object the provision of an improved and substantially instantaneously operable current limiting protective device for power circuits which maintains electrical continuity therethrough during and after its current-limiting action, and further contemplates the circuit coupling of such a device with reclosable current interrupting means, such as a contactor, switch, or circuit breaker, to effectively interrupt excessive currents of short circuit magnitude without undue burden on the interrupting element.

In carrying out my invention in one form, I provide a body of exceedingly strong and inelastic non-porous insulating material having one or more capillary passages formed therein and filled with a vaporizable metal each to form a conducting filament, plural capillaries, if provided, being disposed in substantially parallel spaced-apart physical relation and connected in parallel electric circuit relation, such device functioning upon the conduction of current of large magnitude to develop within the capillaries sustained high pressure arcs having high voltage gradients.

In a preferred embodiment of my invention I provide an exceedingly inelastic enclosure capable of withstanding explosive internal forces for significant periods of time, such, for example, as a full half cycle of commercial alternating current. Within that enclosure there is provided an insulating body formed of a non-porous, high density ceramic having one or more capillaries extending therethrough. These capillaries are filled end-to-end with a conducting material which in one of the preferred embodiments is a eutectic mixture of sodium and potassium. Opposite ends of these conductive material-filled capillaries are in contact with terminal members insulated from one another and extending to the outside of the enclosure. The contents of this explosion-proof enclosure are preferably placed under high initial pressure.

The conductive material in the capillaries is capable of carrying a predetermined amount of current without substantial change in its electrical properties. However when the device is subjected to excessive currents of sufficient magnitude to vaporize all or part of the conductive material within the capillaries, an extremely high pressure high resistance steady-state arc is established in each capillary, limiting and reducing the current flow therethrough to levels which may readily be interrupted by conventional switching means.

In one presently contemplated combination aspect of my invention, I provide a circuit including a device of the foregoing character so interconnected with a circuit breaker or switch that the current-limiting device limits potentially destructive currents to a magnitude within the interrupting ability of the circuit breaker or switch. Such circuit breaker preferably is provided with thermal as well as magnetic tripping elements, both of which are coordinated with the current characteristics of the limiting device. In the event of large faults or short-circuit current through the circuit breaker, the current-limiting device acts substantially instantaneously to limit and reduce the let-through current and to permit the circuit breaker itself to interrupt the reduced current.

In appearance the contents of the current limiting device itself resemble superficially some types of fuses except that, as will become apparent, in the event that the conductive material in the capillaries vaporizes it continues to occupy substantially the same volume as in its solid or liquid state. Actually when currents of values in excess of a predetermined amount are passed through the device, the conductive material in the capillaries vaporizes in situ. Since the entire assembly is exceedingly inelastic and non-porous the vaporized conductor within the capillaries develops enormous pressures. Consequently, although a conductive path through the current limiter is maintained, the arc which is sustained in the device is a high voltage gradient, current limiting arc. The higher the pressure becomes, the higher the voltage developed across the device and the more efficient the current limiting action. Because of the small heat sink provided by the conductive capillaries the response of this current limiter is extremely rapid. Because of the comparative inelasticity of the enclosure and the rigidity with which the conductive material in the capillaries is held, the conductive material continues to occupy the same volume with substantially no oscillating expansion and contraction permitted. And because the conductive contents are not blown out of the capillaries the device may be used repeatedly without even being reset.

The details of this invention as well as additional objects, advantages, and applications thereof will be more readily perceived from the following description together with the accompanying drawings wherein:

FIG. 2 is an enlarged plan view of the insulator body portion of the device of FIG. 1;

FIGS. 3, 4, 5 and 6 are cross-sectional views showing various alternative modes of construction for current limiting devices embodying my invention;

FIGS. 10 and 11 are diagrammatic views of a current limiter embodying my invention and connected in another circuit arrangement with a switching device, FIG. 10 showing the switch in closed circuit position and FIG. 11 showing the switch open.

FIG. 12 s an oscillographic trace of current through the limiting device in the circuit of FIGS. 10 and 11.

Figure 1:
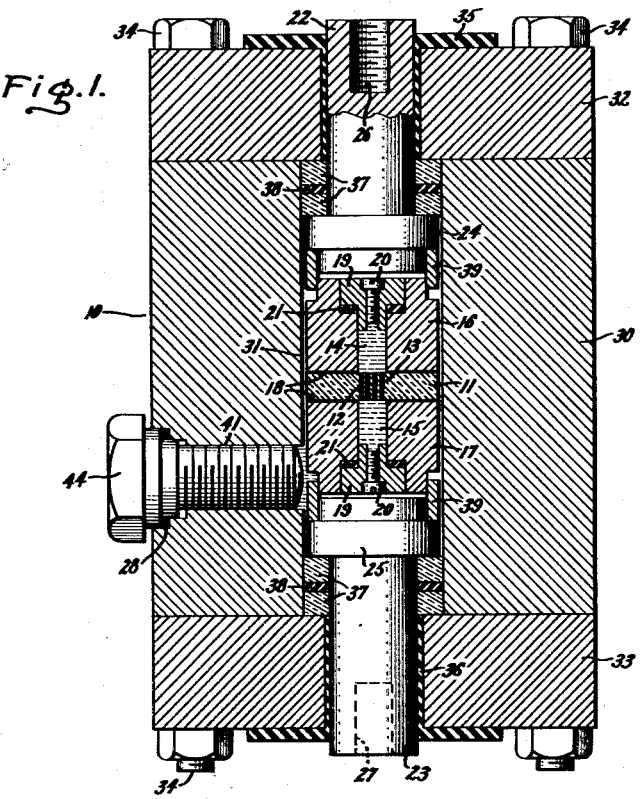
FIG. 1 is a cross-sectional view of a current limiting device constructed in accordance with this invention.

Turning now to FIG. 1 there may be seen a preferred embodiment of a current limiter constructed in accordance with this invention having a very strong steel housing 10 at the center of which are the elements which provide the current limiting action. The housing is shown as a tubular body of any desired outer cross sectional configuration and having a cylindrical axial opening in which the current limiter element is disposed as a core in radially spaced-apart relation with the housing. The current limiting element comprises a body 11 of dense non-porous ceramic material, herein illustrate as a disc, and having a number of substantially parallel centrally located capillaries 12 each filled end-to-end with a metallic conductor 13. Additional details concerning the ceramic body 11, its capillaries 12, and the metallic conducting material 13 are to be set forth below after a description of the general organization and operation of the device. Meanwhile it should be kept in mind that the severest physical demands are to be made of these parts and that, in order to obtain the maximum benefits from the practice of this invention, the highest grades of materials should be employed.

Opposite ends of the conductor-filled capillaries 12 are in electrical contact with reservoirs 14 and 15 also filled with the same conductive material. These reservoirs are contained within internal terminal conducting members 16 and 17 which are bonded at boundaries 18 to the ceramic disc 11 to complete a rigid enclosure for the conductor-filled capillaries. The particular embodiment shown is designed to accommodate within the capillaries 12 and the reservoirs 14 and 15 a metallic conductor which at ordinary temperatures is liquid. To contain the liquid conductor within its capillaries and the reservoirs and to adjust the total enclosed volume therein to coincide with the volume of conductive material employed, each internal terminal member 16 and 17 has inserted therein with a light interference press fit a plug 19. An annular gasket or liquid seal 21 is interposed between each terminal member 16 and its plug 19. Each plug contains a screw member 20 axially adjustable at the time the reservoir and capillaries are filled to exclude vapor locks or air bubbles which can cause the malfunction of the device. Filling of the reservoirs and capillaries is preferably carried out in a vacuum chamber, after which air under normal pressure may be admitted to the chamber, thereby forcing the liquid conductor into any unfilled voids.

In electrical contact with the outer ends of the internal terminal members 16 and 17 are a pair of terminals 22 and 23 respectively. These terminals have flanges 24 and 25 on their inner ends and internally threaded bores 26 and 27 on their outer ends accessible from the outside of the steel enclosure. Through these threaded bores electrical contact may be made between the current limiter device and the circuit within which it is employed. The enclosure 10 comprises a stout steel casing 30 preferably in the form of a rectangular solid with a cylindrical axial bore 31 containing the current-limiting elements. On either end of the casing 30 are provided steel caps 32 and 33 clamped by four machine screws 34, of which two are visible in FIG. 1, which extend through the casing 31 and the caps 32 and 33. When it is realized that the device shown in FIG. 1 is drawn to scale, it becomes apparent that the device is designed to withstand very large pressures.

Obviously some arrangements must be made to insulate portions of the current limiter from its steel enclosure. To that end terminals 22 and 23 have about them insulating sleeves 35 and 36 respectively, preferably formed of a suitable epoxy resin and having large external flanges to provide a generous oversurface leakage path to prevent creep tracking. Backing up the internal flanges 24 and 25 of terminals 22 and 23 are a pair of insulating spacer assemblies each including two ceramic rings 37 with a dense packing member 38 therebetween. These spacer assemblies aid in insulating the terminals 22 and 23 from casing 30, and they serve to maintain the terminals within the enclosure by transmitting compressive forces of the clamped caps 32 and 33 to the shoulders 24 and 25 of the terminals.

The internal terminal members are spaced from the walls of bore 31 by reason of the fact that they fit tightly within cup-shaped collars 39 of terminals 22 and 23. The ceramic disc and its internal terminal members are insulated from the casing 30 by a hydraulically pressurized oil which fills the space between these elements and the inner surfaces of the axial bore 31 within the casing. In order to equalize the hydraulic oil pressures between the ends and the sides of internal terminal members 16 and 17 the collars 39 are "castled," or deeply notched longitudinally, about the periphery of their reduced end portions. The oil is preloaded by means to be described in order to place a high initial pressure on the internal parts of the current limiter, thereby to aid in holding the limiter assembly together while under the influence of the potentially destruction forces which are developed during current limiting operation. I have obtained hydraulic pressures of as high as 300,000 pounds per square inch with a construction of this type.

At the pressure gradients resulting from pressures of this magnitude many materials which are ordinarily rigid, including some metals, may flow like warm butter. It is therefore to be expected that in order to contain these pressures the various packing materials shown in FIG. 1, such as packing member 38, are very stiff, not at all rubberlike, and that the tolerance surrounding these materials must be very close.

I have shown a threaded opening 41 communicating with the axial bore 31 from the outside of the casing to provide for filling the casing with oil. The bore 41, through which an excess of hydraulic fluid is introduced, is provided with a threaded bolt 44 to force out excess fluid and to close the casing. Cap 32 is then tightened down causing a piston-like stroke of rings 37 and member 38 to force the fluid into high compression.

As described, the current limiter shown in FIG. 1 has a conducting path extending from one terminal 22 to the other terminal 23, thus conducting all currents in parallel circuit relation through the conductor-filled capillaries 12 in the ceramic disc 11, best seen in the enlarged end view of FIG. 2. As was mentioned in the brief summary of the invention preceding the present detailed description, currents through these capillaries in excess of a predetermined magnitude actually occasion the vaporization of most of the metal within the capillaries. Since no provision is made for the escape of the vaporized metal, the temperatures and the pressures which develop in the capillaries are very large, the temperatures sometimes even exceeding those at the surface of the sun. The fact that the conductive material in the capillaries actually vaporizes without substantial change in volume is a difficult one to grasp, but an important feature of this invention. Very little is known of the characteristics of a vapor in this state, which is said to be "its critical point, i.e., that condition of a vapor at which no further increase in pressure can cause it to condense." Moreover, the general gas laws concerning pressure, temperature, and volume do not apply to a super-heated vapor of this nature.

The entire enclosure should be sufficiently rigid to prevent any substantial flexure or elastic deformation due to the very large internal pressures generated in the capillary apertures. If such flexure were permitted the conductive material within the capillary apertures would alternately expand and contract with a detrimental oscillatory movement. In fact in those circuits for which this device is intended the large electrical currents through the device develop a high pressure arc, the potential drop across which results in a rapid and continuous current limiting action. The current limiting high-voltage gradient across the arc, being of the order of a thousand volts per inch, depends upon the pressure in the arc and it is therefore important to contain the pressure developed instead of to relieve it. Oscillation of the conductive material in the capillary apertures might interrupt and reestablish the arc periodically. At the very least it would cause an oscillation of pressure within the device which, by periodically reducing the internal pressure would periodically inhibit the current limiting action. Consequently, the enclosure is made sufficiently rigid to prevent oscillatory movements of the conductor in the capillaries which would cause substantial changes in volume of the conductor.

In accordance with an important feature of the invention, the current limiting device does not itself cause the current to go to zero. For if the arc were to be quenched, the conducting capillaries would immediately become, through condensation of the metal vapor, a conducting path once again for the establishment of a new arc and the current limiting function would be adversely affected consequently, during current limiting action, the device consumes substantial amounts of energy. Its ability to dissipate these energies without serious damage to itself is one of its significant characteristics.

It is very important that the number, length, and diameter of the conductor-filled capillaries in the ceramic body of the current limiting device be selected to provide optimum operation of the device with regard to the electrical characteristics of the circuit in which the device is to be used. Considerations involved in the determination of these characteristics include the following:

A. *Current regulation.*—In accordance with the invention the current regulating action of the device by which the current through it is suppressed to a desired level without extinction is achieved primarily by adjusting the length of the capillaries in accordance with the line voltage of the system in which the device is intended to be used and the desired magnitude of the regulated or suppressed current desired to be permitted. This adjustment is possible because at any given current level the voltage drop of the filamentary high pressure arc, over and above the relatively small portion (about 15 volts) caused by the cathode and anode voltage drops, varies with the length of the arc. I, therefore, select a length for such conductor filaments which provides a total arc voltage drop which, in the current suppression portion of the device's characteristic, is less than the line voltage by an amount sufficient to provide the desired level of suppressed current.

The magnitude of the desired suppressed current, in turn, is determined primarily by the amount of time which the current may be expected to remain at the suppressed level before extinction by other means, and by the ability of the current limiting device to dissipate the energy developed during this time. In general, I prefer to maintain the current during this period as low as practical. On the other hand, in certain instances it may be found desirable to tolerate a moderate amount of current at this time in order to permit shortening the capillaries.

B. *Power loss when not current limiting.*—The normal or non-arcing power loss associated with a given capillary of a given diameter is directly proportional to its length. For this reason, it is desirable that the capillary length be maintained as short as possible consistent with other factors. The shorter the length, of course, the higher will be the required voltage gradient through the capillaries in the arcing condition. In accordance with the invention, I subdivide the required cross-section of conductive material for a given normal or continuous current rating into a number of relative small diameter filamentary conductors, each having a relatively high voltage gradient in the arcing condition, and a relatively short length.

C. *Arc energy absorption.*—The thermal efficiency of the device, i.e., its efficiency in dissipating the internally developed energies without serious damage to itself, depends on a number of factors, chief among which is the ratio of surface area of these capillaries to their contained volume. The combined surface area of all the capillaries should be as large as possible for any given current rating, for on this surface area depends the rate at which energy released within the capillaries may be dissipated. The capillaries should therefore be as small as possible and should be correspondingly numerous to make up the combined cross-sectional area required.

D. *Pressure.*—While actual measurements of the pressure within the capillaries are not as yet available due to limitations of present pressure measurement techniques, it is believed that the subdivision of the conductive medium into fine capillaries also results in lower pressures within such capillaries for any given current density, due to the improved energy absorption rate provided thereby. Such reduction in pressure is, moreover, not achieved at the expense of reduced voltage gradient. Thus, energy absorption or cooling of the arc causes deionization thereof and increases the voltage gradient therethrough.

At the same time, nevertheless, my observations indicate that the voltage gradient of the arc is improved by increased pressure. Thus, it appears that the voltage gradient across the capillaries is a positive function both of pressure and of the energy absorption rate. The provision of relatively fine capillaries accordingly contributes to higher voltage gradients by providing better energy absorption at a given pressure.

E. *Manufacturing economy.*—The number and size of these capillaries should be consistent, of course, with reasonable economy in the manufacture of the device. Although I have made capillaries for this purpose as small as .0003 inch such capillaries are very difficult to make and to fill with a conductive material. I have successfully filled capillaries as small as .001 inch, but have found that a reasonable compromise with all factors involved is to employ capillaries of about .0135 inch. Such capillaries are small enough in diameter to give a fairly high ratio of surface to volume, but large enough to be drilled and filled with comparative ease. With dimensions of this size the thirty-seven capillaries shown in the ceramic disc of FIG. 2, when filled with mercury, are capable of carrying currents of 150 amperes continuously without special cooling provisions and of limiting currents significantly in excess of this value. The distance between the capillaries is not too critical, but I prefer to group them in the center of the disc as shown so that the surrounding portions of the ceramic disc provide a substantial amount of reinforcement.

It has already been stated that maximum benefits of this invention are realized when high grade materials are employed in its construction. There are no known materials in the universe, however, which cannot be eroded by a high temperature, high pressure arc. Nevertheless the subdivision of the arc into a number of very small parallel-connected sections results in the radiation and conduction of energy away from the arc sections with such speed that the capillary surfaces of the ceramic disc, for example, are but little affected by the arcs. This is not to say that the disc has an unlimited life, for it is in fact eroded somewhat each time a high temperature arc is produced within it. But the construction of the device minimizes the destructive effects, and promotes a long useful life so that the device is capable of repeated current limiting operations.

To further minimize the destructive effects of the current limiting arcs, I prefer to employ as the material for disc 11 a very dense polycrystalline ceramic formed principally of fine-grain high-purity aluminum oxide powders which are pressed at room temperatures and fired at temperatures which are higher than usual for ceramics. This material, a product of modern scientific research, is available in limited quantities at the date of this writing from General Electric Company under the name Lucalox. Among its characteristics which suit it particularly well for use in devices constructed according to the present invention are its extremely high physical strength, its phenomenal resistance to high temperatures, and its remarkable translucence. These advantageous characteristics are due in large part to the fact that the microscopically small pores or bubbles normally found in ceramic materials are virtually absence from Lucalox. The translucence of this material contributes further to the effective cooling of the current limiting arcs, by improving radiation of energy through the ceramic disc to a surrounding medium. I do not wish to give the impression that the practice of this invention necessitates the use of this particular ceramic material, for other dense insulating materials may also be employed, but it is should be understood that this material is, in my experience, the most suitable of those available.

Another contribution to the thermal efficiency of this device is afforded by the relatively massive internal terminal members 16 and 17 together with their enclosed reservoirs of conductive material, both of which are disposed very close to the high temperature arcs in the capillaries. By contrast, current limiting fuses customarily have long perforated fusible filaments, the major portions of which are remote from the more massive end terminals. And because the fusible elements are ordinarily surrounded by quartz sand, which is a very effective thermal insulator, the small arcs formed by fusing and vaporization of the filaments at their perforations do not cool as readily nor do they develop potentials nearly as high as the arcs developed in current limiters constructed according to the present invention. Furthermore, current limiting fuses, because of their relatively poor thermal efficiency are subject to a fault known as nuisance tripping; that is to say, currents at or near their rated current levels may, because of the effective insulation of the filter, cause a partial flow of the fusible elements with a consequent undetected change in the current interrupting characteristics. As a result, later currents within the original current rating of the current limiting fuse may cause the fuse to interrupt unnecessarily. These faults, common in current limiting fuses, are substantially overcome by the present invention largely because of its high thermal efficiency.

Materials mentioned so far in this description to fill the capillaries 12 have been mercury and eutectic mixture of sodium and potassium. These are not the only such materials which may be employed, nor is it absolutely essential that conductive materials within the capillaries be a liquid at ordinary temperatures. I have preferred to use liquid metals, however, because such metals should be capable of producing a faster current limiting action than should solid metals similarly employed. This is a consequence of the fact that in raising the temperature of a given amount of any substance a definite energy input is required merely to change its state from solid to liquid without even elevating its temperature. This heat of fusion, as it is called, represents a definite amount of energy which must be put into any given quantity of the material before the temperature of the conductor may be raised further toward its temperature of vaporization. Necessarily, a certain amount of time is required to perform the function of melting a solid metal. In the current limiting device described herein, the extra time required, though small, would delay the current limiting operation. A metal already in its liquid state thus has a head start, so to speak, on a solid metal and should usually be capable of reducing overload or short circuit currents more quickly than a normally solid metal. Furthermore it is generally true that metals which are liquid at ordinary temperatures also have lower boiling points, and this too should contribute to the rapidity with which they vaporize and limit current in such devices. In addition, by its nature a liquid metal is easier to handle in filling small spaces such as those in the capillaries. Nevertheless, despite these factors I have successfully used silver as a filler for the conductive capillaries.

In selecting a conductive material to be employed within the capillaries, other considerations are involved than its physical state or its conductivity. For example its chemical nature should also be kept in mind. It is to be noted that very active metals, such as lithium, sodium, and potassium, may combine chemically with the ceramic of which disc 11 is formed. At ordinary temperatures and in the absence of catalytic materials oxidation-reduction reactions of this nature may proceed so slowly as to be negligible. However, under the influence of very high temperatures and pressures the reaction may be considerably accelerated with a consequent gradual chemical deterioration of the ceramic disc. This, of course, would alter the size of the capillaries, and would consume some of the conductive material. It would therefore have an important effect upon the electrical characteristics of the device. Shelf life is also a factor to be considered, for even if the current limiter is not actually in use or if it is in use continually but is never called upon to limit excessive currents, a very slow but progressive chemical reaction may alter its electrical characteristics to the disadvantage of the user. Hence, a less active metal such as silver offers certain advantages which cannot be ignored. For myself I have preferred to employ mercury as a reasonable compromise, but I wish it to be understood that this is purely an illustrative preferance, and that many other vaporizable conductors may be employed without departing from these teachings, the selection of a particular conductor depending on the exigencies.

Although the materials employed for the construction of the disc 11 and for the conductive material within its capillaries are the most critical, the selection of other materials used in the current limiter should also be carefully made. For example, the internal terminal members 16 and 17 are preferably formed of a material whose temperature coefficient of expansion matches as closely as possible that of the ceramic disc 11. For this purpose I prefer to employ a solid conductive material formed of a mixture of ceramic and metal and identified in the trade as cermet. In view of the extremely high pressures contemplated in operation and the consequent requirements for strength and rigidity in the entire structure, it is essential that any ceramic bond, such as that at the boundaries 18 of FIG. 1, be of the highest quality. Various suitable bonding techniques are known in the art. One such method will be described hereinafter, but it will be understood that the bonding method selected must be compatible with the materials of the ceramic disc and its bonded terminals. The gaskets 21 and 38 may be of a relatively stiff silicone rubber if the tolerances about them are very close. O-rings of the same material may be inserted under the heads of the screw members 20 as a further aid in sealing the reservoirs 14 and 15 after filling. However, for the gasket 28 inserted under the head of the bolt 44, I prefer to use a soft metal such as copper.

At FIGS. 3, 4, 5 and 6 I have shown current limiter elements embodying my invention in various other structural forms. All these current limiter structures, including that of FIG. 1, may be used with or without the hydraulic preloading described in connection with FIG. 1. In the embodiments of FIGS. 3, 4, 5 and 6, parts corresponding to like parts at FIG. 1 have been assigned the same reference numerals.

The current limiter shown at FIG. 3 comprises a central disc-shaped insulating body 11 of dense, nonporous, vacuum-tight, highly refractory ceramic material, as described hereinafter. As will be noted hereinafter, other refractory materials may be used for the disc 11 if they provide the required strength, temperature resistance and thermal conductivity. The disc 11 is provided with a plurality of small-diameter parallel holes or capillaries 12 extending therethrough in the central region thereof. A pair of elongated terminal members 16, 17, having flanges 16a, 17a, respectively, of substantially the same diameter as the disc 11, are provided, which are integrally bonded to the opposite sides of the disc 11 by brazing, in a manner to be described. In this structure of FIG. 3 the terminals 16, 17 are formed of stainless steel. A pair of additional ceramic members or "back-up" members, 51, 52, are also provided of the same material as that of disc 11, bonded to the outer surfaces of the flanges 16a, 17a, for a purpose also to be described.

The steel terminal members 16 and 17 are each provided with a relatively shallow central circular recess 14 and 15, respectively, of sufficient diameter to encompass all of the ends of the capillaries 12, for a purpose to be described.

To facilitate filling of the assembly with liquid conductive material in a manner to be described, the terminal member 17 is also provided with an axial opening extending from the recess 15 to the outer end of the terminal and comprising a first relatively small diameter portion 15a and a second relatively large diameter portion 15b, which is tapped to receive the shank of a closing bolt 20. The axial opening also includes a further enlarged portion or counterbore 20a to receive the head of the bolt 20 and providing a circular shoulder or ledge 20b adapted to support a sealing ring 21 which is clamped thereagainst by the head of the bolt 20.

Thus the recesses 14, 15, the capillaries 12, and the openings 15a and 15b constitute a sealed chamber which is closed by bolt 20 and seal 21. This chamber, in the illustrated embodiment, including all portions thereof, is completely filled with mercury 13, the portion of the mercury filling the capillaries 12 thereby forming a plurality of relatively fine filamentary conductors within the ceramic disc 11 interconnecting the relatively large conductive assemblies at each side of the disc 11 comprising the terminal members 16 and 17 and the portion of the mercury fill therein.

Following filling of the chamber in the manner described above for FIG. 1, the bolt 20 is inserted, there being still at this time mercury in the major portion of the opening 15b. Insertion of the screw displaces a portion of this mercury and forces it out of the terminal 17 around the threads of the bolt until the head of the bolt contacts the O-ring seal 21. Further tightening of the bolt 20 compresses the seal 21 slightly creating a vapor-tight seal and placing the mercury under a slight compressive force.

In the form shown in FIG. 3, in which the disc 11 comprises alumina ceramic and the terminals 16 and 17 are of stainless steel, the terminal members are of the flanged construction as shown and described particularly for the purpose of facilitating the bonding of the terminals to the alumina ceramic disc 11 to provide a vapor-tight, high-strength bond.

The parts referred to may be bonded together by various methods presently known to the art. A method which has proved particularly effective, is as follows.

The ceramic disc 11 is prepared by lapping the bonding surfaces thereof to a high degree of smoothness, after which it is washed, dried, and heated in air at 1000 degrees centigrade for one hour. The terminals 16, 17 are ground to a high degree of smoothness at their bonding surfaces, washed, dried, and heated in a vacuum at 1000 degrees centigrade for one hour, and permitted to cool at room temperature before removing from the vacuum.

The bonding surfaces of the ceramic are next coated with a thin even coat of a mixture comprising 66 parts of amyl acetate to 10 parts of indopol polybutene, and allowed to dry. These surfaces are then coated with a layer of titanium hydride powder, the coating having a density of about .00041 gram per square inch of surface.

A brazing shim is then prepared comprising a thin flat ring of silver-copper eutectic alloy, the amount of alloy used being equal in weight to .616% of the amount of titanium hydride used. The brazing shim is also cleaned by washing in acetone, drying, and heating at 400° C. for 20 minutes in a vacuum, being allowed to cool before removal from the vacuum.

The parts are then assembled in the desired relation with a brazing shim between each pair of surfaces to be joined, and held by a suitable fixture, not shown, so that an initial loading force of 30 lbs./in.$^2$ is applied to the areas to be brazed. A vacuum of less than $10^{-4}$ mm. of Hg is drawn on the assembly, and it is heated to 500 degrees centigrade. When the titanium hydride is transformed by this heat to titanium, liberating hydrogen, the temperature is increased to 1000 degrees centigrade until the silver-copper eutectic brazing shim melts, the temperature being continued at this value for one minute thereafter. The assembly is then allowed to cool in the vacuum to room temperature.

Since the alumina ceramic material of the disc 11 has a substantially different (lower) coefficient of thermal expansion from that of the stainless steel metallic material of the terminal members 16, 17 substantial shear stresses are set up at the bonded interfaces. These forces tend to bend the bonded components in what is known as a "bimetal action." Thus such a metal, bonded at high temperature to a ceramic surface, would, upon cooling, tend to "peel off" or bend away from the bonded surface, pulling away portions of the ceramic with it. This is avoided in the embodiment disclosed in FIG. 3 by the expedient of providing the terminals with relatively thin flange portions 16a, 17a, and by bonding "back-up" or "balancing" ceramic members 51, 52, of the same material as the disc 11, to the outer surfaces of the flanges 16a, 17a, at the same time and in the same manner that the flanges 16a, 17a, are bonded to the center ceramic disc 11. This causes the bending stresses set up in the flanges 16a, 17a because of the bonding at the inner interfaces to be balanced by similar but opposite-acting stresses set up because of the bonding at the outer interfaces.

As may be indicated by the requirements of size, current-rating, number of capillaries, etc., I may supplement or replace the bonding of the terminal members to the ceramic body by mechanical clamping means, so long as a vapor-tight seal is maintained at the interfaces.

In FIGS. 4 and 5, I have shown embodiments of my invention in which the central ceramic disc and the terminal members have matching thermal coefficients of expansion. In these forms, the back-up or stress balancing ceramic rings 51, 52, of the form of FIG. 3 are omitted, and the flanged construction of the terminals 16, 17 is replaced by a simple cylindrical structure. This simplifies the assembly and also increases the strength of the terminal members.

In FIG. 5, the terminal members 16, 17 are constructed of titanium, and the insulating disc 11 is constructed of a ceramic material having the same coefficient of thermal expansion as that of titanium. Such a material is available commercially under the trade name of "Forsterite," from General Electric Company, supra. The other features of construction of this form, including the bonding technique, may be similar to those of the form of FIG. 3.

In FIG. 5, the insulating disc 11 is constructed of a type of ceramic material as described in connection with FIG. 3. The terminal members 16, 17, however, are constructed of a conductive material comprising a mixture of ceramic and metal, and known to the trade as a "cermet" material, having a thermal coefficient of expansion about equal to that of the ceramic disc 11.

In this case, since cermet materials cannot be satisfactorily tapped to receive a closing screw such as screw 20 of FIG. 3, a different technique of sealing is employed. In accordance with this aspect of the invention, the cermet terminal member 17 is provided with an axially extending hole or bore 15b by suitable means, such as by drilling, and also with a transversely extending hole 17c which connects with the hole 15b. The assembly is evacuated and filled with mercury in the manner previously described and the assembly is sealed in the following manner.

A closely fitting aluminum pin 54 is driven into the hole 17c so as to extend across the end of the hole 15b. A pair of closely fitting steel pins are then driven into the hole 53 from each end thereof simultaneously, compressing the aluminum pin and the trapped mercury and causing a portion of the aluminum pin to be extruded slightly into the hole 15b. This provides a positive vapor-tight and mechanically strong seal.

In the form of the invention shown in FIG. 6, the metallic terminal members 16, 17 are held to the ceramic body 11 by mechanical clamping rather than by bonding. In this connection it must be noted that such metallic members cannot be clamped directly against the ceramic body, since it is not possible to produce perfectly planar surfaces and cracking of the ceramic will occur during clamping or in use. Accordingly, in this form, the metallic terminal members 16, 17, are clamped by bolts 55 against the ceramic disc 11, with resilient O-ring seals 56 therebetween at each interface, being seated in circular grooves in the corresponding faces of the terminal members. The bolts 55 are insulated from the terminal member 16 by means of a spacer 57 and insulating sleeves 58, and are threadedly engaged in terminal member 17. A generally ring-shaped or torroidal insulating spacer 59, having openings for the bolts 55, serves to space the terminal members 16, 17 so that when they are clamped thereagainst by the bolts 55, only a predetermined force is exerted upon the ceramic body 11.

The construction of the assembly, including capillaries 12, recess 14, axial opening 15 and plug-screw 20, is generally similar to that described in connection with FIG. 3.

Figure 7:
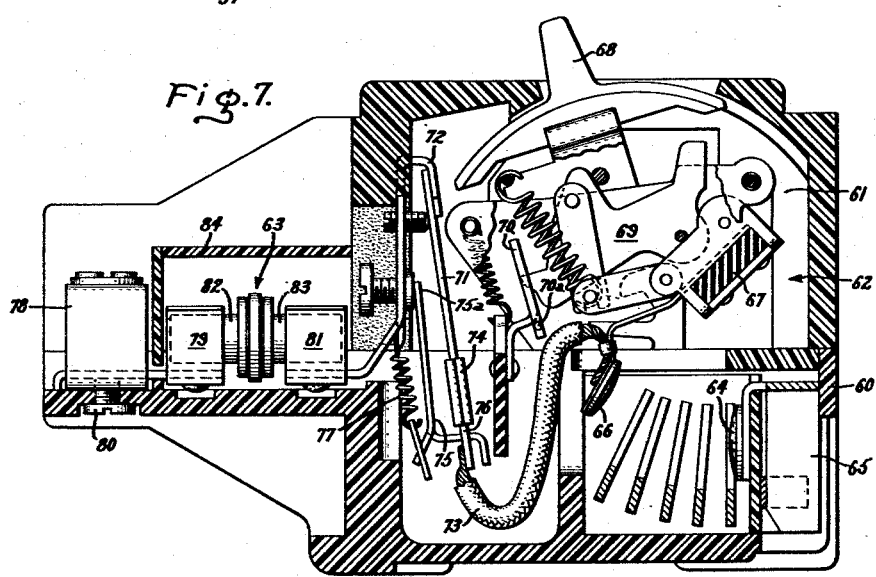
FIG. 7 is a side cross-sectional view of a circuit breaker and current limiter combination combined in a unitary mounting for series-connected coordinated protective operation.

At FIG. 7 I have shown a combination circuit breaker and current limiting device integrally mounted in a unitary casing for connection in series circuit relation to illustrate a preferred circuit aspect of my invention. It will be obvious, of course, that the invention may be embodied in other protective circuit arrangements connecting an electrical load with a source of electric current supply, and may include other switching or control devices as will be further illustrated hereinafter. It will also be evident that, while FIG. 7 shows a single pair of contacts and only one current limiter, a separate series-connected combination of these devices would be used in each line of a polyphase circuit. Thus for a three-phase line the circuit breaker of FIG. 7 represents a three-pole breaker only one pole of which is shown.

At FIG. 7 the combined protective device comprises an insulating casing including a base 60 and a cover 61, containing therein a circuit breaker portion 62 and a current limiter portion 63. The circuit breaker portion comprises a fixed contact 64 connected to a plug-in type line terminal 65 and a cooperating movable contact 66, one cooperating pair for each pole, the movable contacts being mounted upon a pivotaly mounted contact cross bar 67. The movable contacts 66 are actuated manually by a handle 68 through an overcenter spring type operating mechanism indicated generally as 69. Such a mechanism is shown in Patent 2,908,782, Kiesel. As will be more clearly evident from the foregoing patent, the operating mechanism 69 is held in its closed circuit position by a latch 70 pivotally mounted at 70a and is biased to move to a tripped open-circuit position upon release of the latch.

For the purpose of moving the latch 70 to releasing position in response to predetermined current conditions in any of the poles, each pole is provided with a combination thermal-magnetic tripping assembly comprising an elongated bimetallic strip 71, rigidly attached at one end to a conductive strip 72 which is mounted upon the casing cover 61. The lower end of the bimetallic strip 71 is connected by a flexible electrical conductor or braid 73 to the movable contact 66. The tripping assembly also comprises magnetic-operating means comprising a magnet fieldpiece 74, rigidly attached adjacent the lower end of the bimetallic strip 71, and an armature member 75 comprising an elongated member pivotally supported at its end 75a in generally V-shaped bearing recesses in the cover 61. The armature 75 has its lower end bent at right angles to its length having a down-turned end engageable with the latch 70 and having a notch through which the bimetallic strip extends and providing a shoulder 76 in engagement with the right-hand side of the bimetallic strip as viewed. The armature is constantly biased to the left, as viewed, by tension spring 77 attached at one end of the terminal strap 72. Movement of the lower portion of the bimetallic strip to the right moves the armature member 75 to the right into engagement with the latch 70. The armature member 75, however, when attracted by the fieldpiece 74, may move to the right as viewed independently of the bimetallic strip 71 to cause tripping.

For the purpose of facilitating connection of an outgoing electrical conductor (not shown), each pole is provided with a load terminal 78 rigidly mounted together with a fuse-clip type socket member 79, to the base 60 by means of screw 80. The lower end of conductive strap 72 is also provided with a fuse-clip type socket 81 rigidly attached thereto by suitable means, not shown. For the purpose of limiting short-circuit currents through the circuit protective device, there is provided a current-limiting assembly or device indicated generally at 63, having endwise extending generally cylindrical terminal members 82, 83, held in electrical plugged-in engagement in the clips 79, 81, respectively. A removable insulating shield 84 is provided for each current limiter 63. Each current-limiting device 63 is of a type described hereinbefore in connection with FIGS. 1 to 6.

In the protective device of FIG. 7, the thermal and the magnetic trip elements each respond to overcurrent conditions to open the circuit breaker contacts when the currents drawn by the load circuit exceed rated currents and each type of trip element contributes certain desirable characteristics to the circuit interrupting capabilities of the circuit breaker. For example, due to their inherent time-delayed action, the bimetallic elements prevent unnecessary service interruption on normal inrush currents, but continuous overloads will cause the bimetals to deflect thus releasing the trip latch and opening the contacts. On the other hand, the electromagnets 74 provide a more rapid circuit interruption in the event of heavy overloads. Excessive current through one of the electromagnets 74 will attract the associated movable armature 75 to trip the circuit breaker in the same manner. It is to be noted that the electromagnets operate independently of the bimetallic elements and that each type of trip element is capable by itself of opening the contacts.

In practice, of course, the structure of the circuit breaker may differ from the described above for illustrative purposes. What is important to note in connection with FIG. 7 is that in the combination there contemplated the breaker should have certain protective circuit interrupting capabilities of its own to protect against overload currents.

By reason of the two types of current responsive elements employed in the breaker of FIG. 7, such a breaker is said to have a thermal-magnetic trip characteristic. The current limiters 63 aid further to protect not only the load and supply circuits but also the breaker against short circuit currents which exceed the circuit interrupting capabilities of the breaker or which occur too rapidly for the breaker to respond to them. These current limiters do not of themselves interrupt the circuit as do current limiting fuses, but function instead to limit potentially destructive currents in order that the more slowly responding circuit breaker may then interrupt the circuit at its contacts. This current-suppresion-without-extinction action is an extremely important aspect of the invention, since it prevents the current limiter from reestablishing its low impedance condition before the circuit breaker operates sufficiently. It will be observed also that this action in addition insures that the circuit will not be interrupted without actuation of the circuit breaker to its tripped condition.

Figure 8:
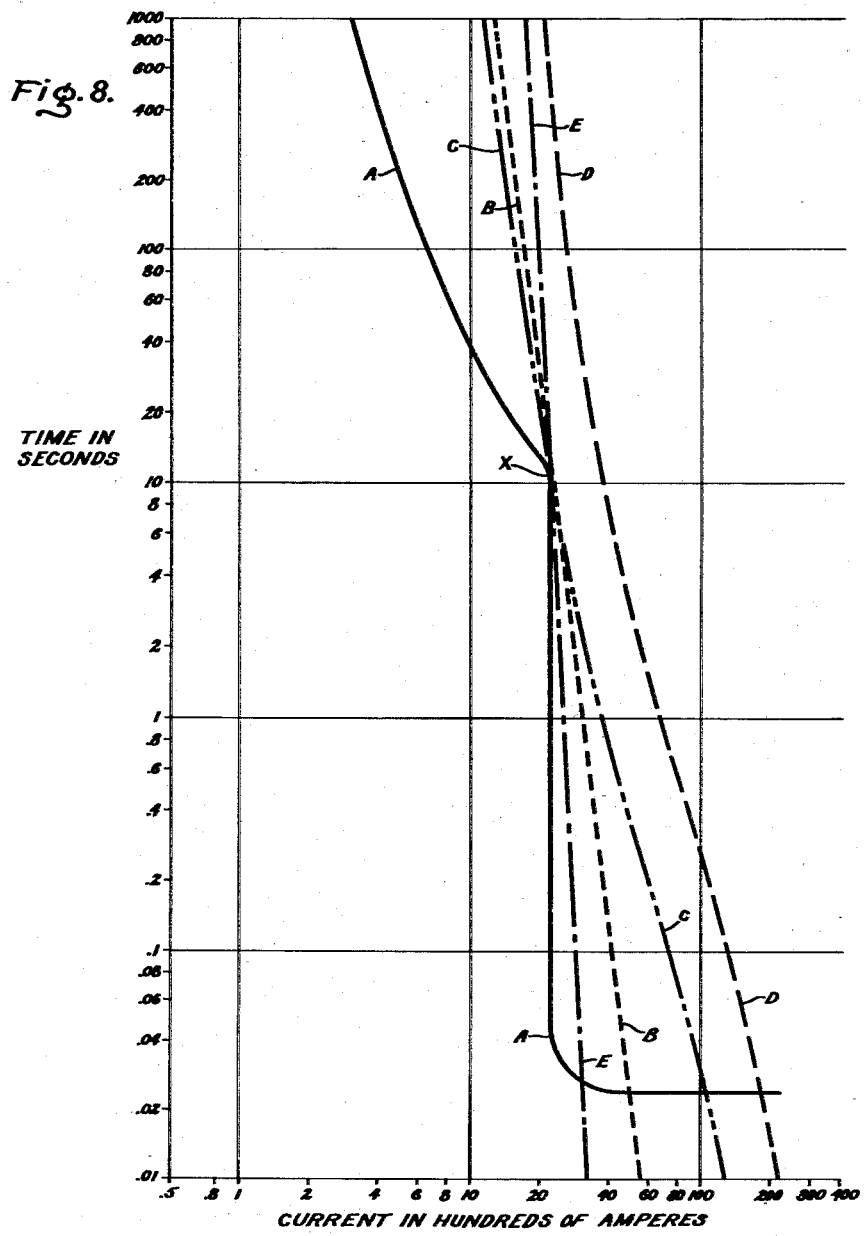
FIG. 8 is a graphical representation of the time current characteristics of a thermal-magnetic-trip circuit breaker, of certain current limiting fuses, and of a current limiter constructed in accordance with the present teachings.

In FIG. 8 is illusrated on logarithmic coordinates the time vs. current trip characteristics, represented by a heavy line curve A, of a 200 amp. circuit breaker having thermal and magnetic trip characteristics. The time scale on these coordinates is represented in seconds while the current scale is calibrated in hundreds of root-mean-square (R.M.S.) symmetrical amperes. It is to be noted that the breaker trip characteristic has two principal parts to it, an upper part sloping downward to a "knee" of the curve at $x$ and a lower part dropping nearly vertically until it levels out parallel to the $x$ axis. The upper part of the curve above the knee is due to the inverse time-current trip characteristics of the thermal trip elements such as bimetals 71 in FIG. 8, while the lower portion of the curve is contributed by the magnetic trip elements such as the electromagnets 74 in FIG. 8. It is apparent that this curve is a combination of two intersecting curves which complement each other. The thermal trip characteristic provides a slow response to prolonged overloads not too greatly in excess of the rated current. For example, overload currents of 800 root-means-square symmetrical amperes, that is, four times the rated current, would cause the thermal elements to trip the circuit breaker in about 60 seconds. For more rapid tripping on much larger overload currents the magnetic trip characteristic below the knee of the curve indicates that the breaker will interrupt the circuit in about .025 second on overload or short circuit currents larger than approximately 2000 amperes or ten times the rated current.

It will be observed from this graph (FIG. 8) that, in general, the higher the excess current through the device, the shorter is the time required for the circuit breaker to interrupt the circuit automatically. It will also be observed, however, that the speed of opening of the circuit breaker portion reaches a lower limit at about 4000 amperes. Thus, no matter how high the excess or short-circuit current may rise the circuit cannot operate to interrupt the current in less than about .023 second. This is due to the fact that although the magnetic tripping action, which frees the mechanism to allow automatic opening, operates practically instantaneously, nevertheless the parts of the mechanism including the movable contact members 66, 67 have sufficient inertia that the operating spring, which has only a fixed amount of stored energy, cannot move them at a greater rate of speed.

It will also be observed that the time values indicated in connection with curve A represent time to interrupt the circuit. Such complete interruption of the current does not occur until the movable contact has moved through a substantial portion of its possible total movement, so as to draw an arc of sufficient length to overcome the driving voltage. Thus, it has been determined that the movable contacts move a small amount sufficient to create gaps between them and the stationary contacts in less than 90 electrical degrees, although complete interruption may not occur in less than about 490 electrical degrees or .023 second.

Circuit breakers of different design and continuous current ratings will have different opening times, of course. In general, however, the fastest acting of such breakers requires at least about .013 second to interrupt overload currents, i.e. about 280 electrical degrees. A short circuit current, it should be noted, may be expected to reach its first major crest in 90 electrical degrees or less.

The general characteristic of circuit breakers by which, on short circuit currents, their tripping mechanism is actuated practically instantaneously, their contacts separate a small amount in less than 90 electrical degrees, and complete interruption of the current is achieved only at some later time such as about 1½ cycles, is an important consideration to be kept in mind in connection with the operation of the complete combination.

Within the minimum time response of the circuit breaker very large let-through currents might be permitted to flow if no provision were made to limit them. For the purposes of limiting let-through or surge currents it has been customary, as has been explained, to employ current limiting fuses in series with a breaker. Characteristics for possibly coordinated current limiting fuses which might be matched with the breaker are plotted as curves B, C and D. Desirably a current limiting fuse should, if properly coordinated with the breaker, accomplish two ends. First it should limit the let-through currents which occur before the circuit breaker can trip to the lowest value possible. Second its characteristic should not cross the knee of the characteristic curve for the breaker, since nuisance tripping would then be the result causing interruptions of the circuit on short overload currents which the system is designed to allow. Because of the negative slope of the current limiting fuse characteristic curves B, C, and D, a compromise must be made between these two requirements. In practice it is customary to select a coordinated current limiting fuse whose characteristic curve comes as close as possible to the knee of the circuit breaker characteristic curve without actually crossing it, and to accept whatever let-through value of current results.

Curve C represents the characteristic curve for an 800 ampere current limiting fuse which is actually available commercially for use with the 200 amp. circuit breaker whose characteriistic curve is represented by curve A. With this fuse the minimum let-through current value represented by the intersection of curve C with curve A is 11,000 amperes or 55 times the rated current of the breaker. In practice, however, since characteristic curves do vary among selected current limiting fuses of the same nominal rating, to prevent nuisance tripping due to an unfortunate mismatch between characteristic curves selected too close to each other, a larger current limiting fuse is often substituted. Curve D represents the characteristic of a 1200 ampere current limiting fuse which may also be employed with the 200 ampere circuit breaker. Its characteristic curve misses the knee of curve A widely, and consequently, the let-through currents permitted to flow are much larger. The minimum let-through value for the 1200 ampere current limiting fuse is represented by the intersection of its curve D with curve A and is 18,000 amperes or 90 times the rated current of the circuit breaker. From this it can be seen that the selection of an appropriate current limiting device is a very serious problem indeed.

Curve B is a characteristic curve based upon calculations I have made of an ideal current limiting fuse constructed according to the best principles known today. A current limiting fuse to match the characteristic curve represented by curve B and to coordinate with a 200 ampere circuit breaker is not available commercially and may never be available. According to my calculations even this perfectly matched current limiting fuse would let through surge currents of at least 4800 amperes or 24 times the rated current of the circuit breaker.

By contrast curve E represents the characteristic of a matched current limiting device constructed according to the principles of the present invention. The current limiter curve E is designed to just miss the knee X of curve A in the same manner as a matched fuse curve such as B, but its closeness at this point is not critical as it is with a fuse. If the fuse should melt at this point, it causes a nuisance interruption and this may occur in a fuse as a result of repeated thermal experiences in this region of the characteristic. With the current limiter of my invention any occasional momentary limiting action at this point of the characteristic does not necessarily interrupt the circuit or require replacement of a component. Even if the breaker does interrupt it, it need only be reclosed. Curve E, in just missing the knee of curve A, crosses the breaker trip characteristic curve at 3000 amperes or 15 times the rated current of the breaker. It is therefore evident that current limiting devices constructed according to my invention effect significant improvements over other known devices intended to accomplish somewhat similar purposes. In terms of the illustrated characteristic curves alone, one of the major advantages of this invention is drastically limiting potentially destructive currents as a consequence of the relatively steep slope of the characteristic curve of the current limiting device as contrasted with the characteristics of conventional current limiting fuses. The steepness of this slope is due in large part to the fact of the small heat sink provided in my current limiting device. The characteristic curves, however, cannot tell the whole story because they do not reveal that current limiting fuses are destroyed in the act of their first current limiting operation, whereas current limiting devices of the nature described herein are capable of repeated operations.

Incidentally the relative sizes of heat sinks in current limiting fuses and in current limiters constructed according to this invention should not be confused with their thermal efficiencies. Conventional current limiting fuses have large heat sinks provided by the large amount of vaporizable metal employed, and relatively low thermal efficiencies as a consequence of the sand or other granular insulating arc quenching material employed. In the practice of this invention, on the other hand, the heat sink provided by the vaporizable metal is comparatively small, while the thermal efficiency of the device in dissipating the energies released within it is relatively high due to the proximity of massive terminals, the translucence of the ceramic disc, and the employment of a large number of parallel-connected capillaries.

Figure 9:
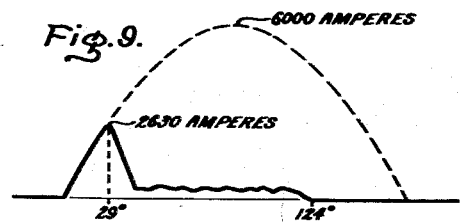
FIG. 9 is a reproduction of an oscillographic trace illustrating the current limiting effect on short circuit duty of devices embodying the present invention.

It remains to be pointed out how a current limiting device constructed as described herein affects the circuit in which it is placed during faults which tend to produce destructive overcurrents. In FIG. 9 is illustrated in dotted lines the envelope of a prospective 60 cycle short circuit current which at its peak would produce 6000 amperes in the circuit. The solid line is a copy of an oscillographic wave trace showing the limited currents which were actually permitted to flow as a result of the presence in the circuit of a current limiter device of the same general type shown in FIG. 1 in combination with a high speed magnetic trip circuit breaker. At 29 degrees on the upward slope of the short circuit current curve the conductive material in the capillaries of the current limiter device vaporized and sharply reduced the current from the value of about 2630 amperes which it had reached down to an average level which, in comparison with the available 6000 ampere scale, was difficult to measure. It will be observed from the graph that the peak let-through current is not a sharply pointed apex on the curve, but rather, is curved. This is believed to be due to the rate of vaporization of the conductive material within the capillaries. Thus, it is believed that the material forming the conductive segments is not all vaporized in the same instant of time. The resistance of the vapor state is rather inserted at a certain rate over a finite space of time. This effect tends to limit the inductive surges of voltage which might occur in the circuit due to the extremely rapid rates of change of current. If further reduction of such inductive voltages is desired, the shape of the capillaries may be modified to provide a minimum diameter at the mid-point of the capillary, widening in conical fashion to a greater diameter at each end of the capillary.

The circuit breaker employed in obtaining the wave trace of FIG. 9 was specially arranged to have an extremely rapid magnetic trip characteristic. At 124 degrees, after the peak of the available short circuit current was passed, the circuit breaker succeeded in opening its contacts and the current which had been limited by the current limiting limiting device fell to zero. The current limiter had therefore succeeded in severely limiting the let-through current and then reducing it to a value within the current interrupting ability of the circuit breaker.

The maintenance of the current in the circuit at a low level during the time interval between the time when the magnetic trip device of the circuit breaker is actuated and the time when the circuit breaker separates its contacts sufficiently to interrupt the circuit contributes importantly to the successful operation of the combination of the current limiter with the circuit breaker, since in this way the power released in the circuit during this interval, and particularly in the current limiter and in the circuit breaker, is maintained at a low level. If the current were not so reduced and regulated during this time, the power released would place an appreciably greater burden upon the current limiter, the circuit breaker, and other components in the circuit. Likewise, if the current limiter were permitted to go into an oscillating conducting-non-conducting condition, the total power released would also be very high, since in each oscillation the current would be permitted to rise to undesirably high levels.

It is significant to note that the value of the current in the regulated or suppressed portion of the graph of FIG. 9, following the initial incidence and reduction of a short circuit current, was determined to be below even the normal current rating of the circuit breaker employed. The circuit breaker is therefore not called upon to perform any more difficult operation than it performs within its normal rating. It should be noted of course, that while the reduced and regulated current of FIG. 9 is in itself not sufficient to trip the circuit breaker, the maximum let-through current peak is sufficient to initiate magnetic tripping operation, which action is self-completing due to the inertia of the mechanism. Circuit breakers in the past have been necessarily designed to be able to interrupt the extremely high values of current occurring in short circuit conditions, although there is only a slight possibility that they will ever be called upon to do so. The present invention makes this unnecessary and permits substantial simplification and consequent economy in the design and construction of such devices for any given current rating.

In FIGS. 10 and 11 I have shown a combination in which the current-limiter is used to supplement a simple switching device, to reduce arcing and to greatly increase interrupting capacity.

In FIG. 12 I have shown a reproduction of an oscillogram showing the type of action obtained with the combination of FIGS. 10 and 11. In this case, the current-limiter 90 is constructed to have a "firing" point just below the normal current value of the circuit. The current-limiter 90 is, however, normally by-passed by the contacts 91, 92, 93, so that it carries only a very small portion of the current. As the contact 91 moves toward open position, however, an interim condition exists, in which the entire current passes through the current-limiter. This change-over occurs at point a on the graph.

No arcing occurs at this point because the current-limiter is in its low impedance state. During the time between points a and b, the entire current passes through the current-limiter and acts to increase the temperature of the conductive metal in the capillaries thereof. At point b, the limiter "fires" and reduces the current to a much lower level. The limiter also functions to maintain the current at this lower level until further movement of the contact 91 causes it to separate from contact 92, interrupting the circuit.

The graph of FIG. 12, moreover, indicates that the current-limiter of the present invention, in addition to its ability to operate to limit and reduce high short-circuit currents, is usable as an inverse-time current-responsive device to permit the flow of predetermined currents for predetermined times, and to thereafter greatly reduce such currents. In this connection, I therefore contemplate the use of the current-limiter as an arc-reducing device in connection with electric current switching functions generally.

The description contained herein is, of course, intended to be illustrative in nature and should not be considered as exhaustive or limiting with respect either to the details of construction of the current limiting device or to the possible arrangements for which it is adapted in particular circuits. The number of conductor-filled capillaries in the current limiter may be large or small depending on the current-carrying requirements of the system but they should be as small in cross-section as possible consistent with economy of construction. It is not necessary that the capillaries be geometrically parallel for I have contemplated that they might also radiate outwardly from an electrode in the center of a disc or sphere and have constructed operative samples in certain forms of this nature. Particularly at lower current ratings a reinforcing structure, such as the hydraulically pressurized housing I have shown, may not be necessary. For example, with a device having a single mercury-filled capillary .180 in. long and .0134 in. in diameter at the center of a disc of Lucalox of ½ inch diameter and having stainless steel electrodes, without any clamping or hydraulic reinforcement to lend increased rigidity to the enclosure, I have successfully and repeatedly limited available currents of from 200 to 677 amperes at about 176 volts. In fact the physical configurations which the current limiter may take can be very diverse, as any worker in the art will recognize, and its precise physical form should not place it beyond the scope of this invention as long as it employs the basic principles described herein. Furthermore, although the invention is shown embodied in a circuit making use of a current limiter device and a circuit interrupting device, it obviously may be used in circuit with interrupters other than those illustrated or in circuit with other impedance devices in the event that current reduction without interruption is adequate for the contemplated purpose. It should thus be apparent that various changes and combinations may be made in accordance with these teachings without departing in spirit or in scope from the invention as set forth in the appended claims.

What I claim as new and desire to secure by Letters Patent of the United States is:

1. A current limiting device for generating high pressure current limiting arcs comprising: a non-porous insulator having at least one elongated capillary aperture extending therethrough; a metallic conductor filling said capillary aperture from end to end; electrical terminal members in electrical contact with opposite ends of said conductor-filled aperture; a rigid enclosure completely enclosing said insulator and said terminal members; a hydraulic fluid under high pressure within said enclosure surrounding said insulator and said terminal members to inhibit elastic deformation of said insulator and members; electrical connection means extending to the outside of said enclosure from said terminal members for connecting said device in an electrical circuit requiring overcurrent protection, whereby currents in said capillary aperture in excess of a predetermined value cause vaporization of the conductive material in said aperture and the generation of high pressure current limiting arc therein.

2. A current limiting device for generating high pressure current limiting arcs comprising: a non-porous insulator having at least one elongated capillary aperture extending therethrough; a metallic conductor filling said capillary aperture from end to end; electrical terminal members in electrical contact with opposite ends of said conductor-filled aperture for connecting said device in an electrical circuit requiring overcurrent protection; means enclosing said insulator and said terminal members and exerting thereon an initial substantial pressure inhibiting elastic movement of any portion thereof, whereby currents in said aperture in excess of a predetermined value cause non-expansive vaporization of conductive material in said aperture and the generation of high pressure current limiting arcs therein.

3. A current limiting device for generating high pressure current limiting arcs comprising: a non-porous translucent ceramic insulator having a plurality of elongated capillary apertures extending therethrough, the total surface area of the capillary apertures being relatively large compared to the volume enclosed by said apertures; a metallic conductor filling said capillary apertures from end to end; rigid electrical terminal members in electrical contact with opposite ends of said conductor-filled apertures for connecting said device in an electrical circuit requiring overcurrent protection, said terminal members being relatively massive compared to the total volume of the conductor within said apertures; means enclosing said insulator and said terminal members and exerting thereon an initial substantial pressure inhibiting elastic movement of any portion thereof; whereby currents in said capillary apertures in excess of a predetermined value cause the vaporization of conductive material in said capillary apertures and the generation of high pressure current limiting arcs therein, the energy developed by said arcs being dissipated by radiation through said translucent ceramic insulator, by conduction into said relatively massive terminal members, and by absorption through the relatively large surface area of said capillary apertures.

References Cited in the file of this patent

UNITED STATES PATENTS

| | | |
|---|---|---|
| 736,127 | Mies | Aug. 11, 1903 |
| 897,852 | Sachs | Sept. 1, 1908 |
| 1,316,095 | Illingworth | Sept. 16, 1919 |
| 1,678,187 | Illingworth | July 24, 1928 |
| 2,306,728 | Heddaeus | Dec. 29, 1942 |
| 2,358,215 | Darling | Sept. 12, 1944 |
| 2,895,031 | Kozacka | July 14, 1959 |
| 2,920,241 | Jacobs et al. | Jan. 5, 1960 |

FOREIGN PATENTS

| | | |
|---|---|---|
| 327,961 | Great Britain | Apr. 11, 1930 |

OTHER REFERENCES

Suits: "Measurement of Some Arc Characteristics at 1000 Atmosphere Pressure," Journal of Applied Physics, volume 10, March 1939, pages 203–206 cited.